United States Patent [19]

Kusters et al.

[11] Patent Number: 5,182,120
[45] Date of Patent: Jan. 26, 1993

[54] DEVICE FOR DOSING INTO MOULDS

[75] Inventors: Johannes K. O. Kusters, St. Oedenrode; Joost A. W. H. Van Der Putten, Aarle Rixtel, both of Netherlands

[73] Assignee: Stork Titan B.V., Boxmeer, Netherlands

[21] Appl. No.: 757,579

[22] Filed: Sep. 11, 1991

[51] Int. Cl.⁵ ............................................. A22C 7/00
[52] U.S. Cl. ...................................... 425/238; 425/256; 425/448; 425/557; 425/559; 426/513
[58] Field of Search ............... 425/238, 239, 447, 448, 425/449, 556, 557, 559, 574, 575, 585, 256, 257; 426/513

[56] References Cited

U.S. PATENT DOCUMENTS

| | | | |
|---|---|---|---|
| 1,757,099 | 5/1930 | Streich | 425/238 |
| 2,301,632 | 11/1942 | Litty | 425/238 |
| 2,413,046 | 12/1946 | Holly | 425/556 |
| 3,121,449 | 2/1964 | Marchadour | 141/161 |
| 3,203,037 | 8/1965 | Anhanger et al. | 425/556 |
| 3,964,127 | 6/1976 | Holly | 426/513 |
| 4,043,728 | 8/1977 | Holly | 425/557 |
| 4,054,967 | 10/1977 | Sandberg et al. | 426/513 |
| 4,126,704 | 11/1978 | McCarthy et al. | 426/304 |
| 4,302,173 | 11/1981 | Persson | 425/238 |
| 4,329,828 | 5/1982 | Wagner | 426/513 |

FOREIGN PATENT DOCUMENTS

| | | |
|---|---|---|
| 004156 | 9/1979 | European Pat. Off. |
| 218790 | 4/1987 | European Pat. Off. |
| 7906962 | 3/1980 | Netherlands |

*Primary Examiner*—Jay H. Woo
*Assistant Examiner*—James P. Mackey
*Attorney, Agent, or Firm*—Wegner, Cantor, Mueller & Player

[57] ABSTRACT

A device for dosing a plastic, perishable mass into moulds has a pressing chamber for receiving a dose of the mass from a feed vessel and a piston operable in the chamber to push and compress the dose into a mould. The device includes a valve for shutting off feed of the mass from the feed vessel and is particularly constructed to avoid spaces into which the mass can collect and spoil, while preventing reentry of the mass from the pressing chamber into the feed vessel.

17 Claims, 3 Drawing Sheets

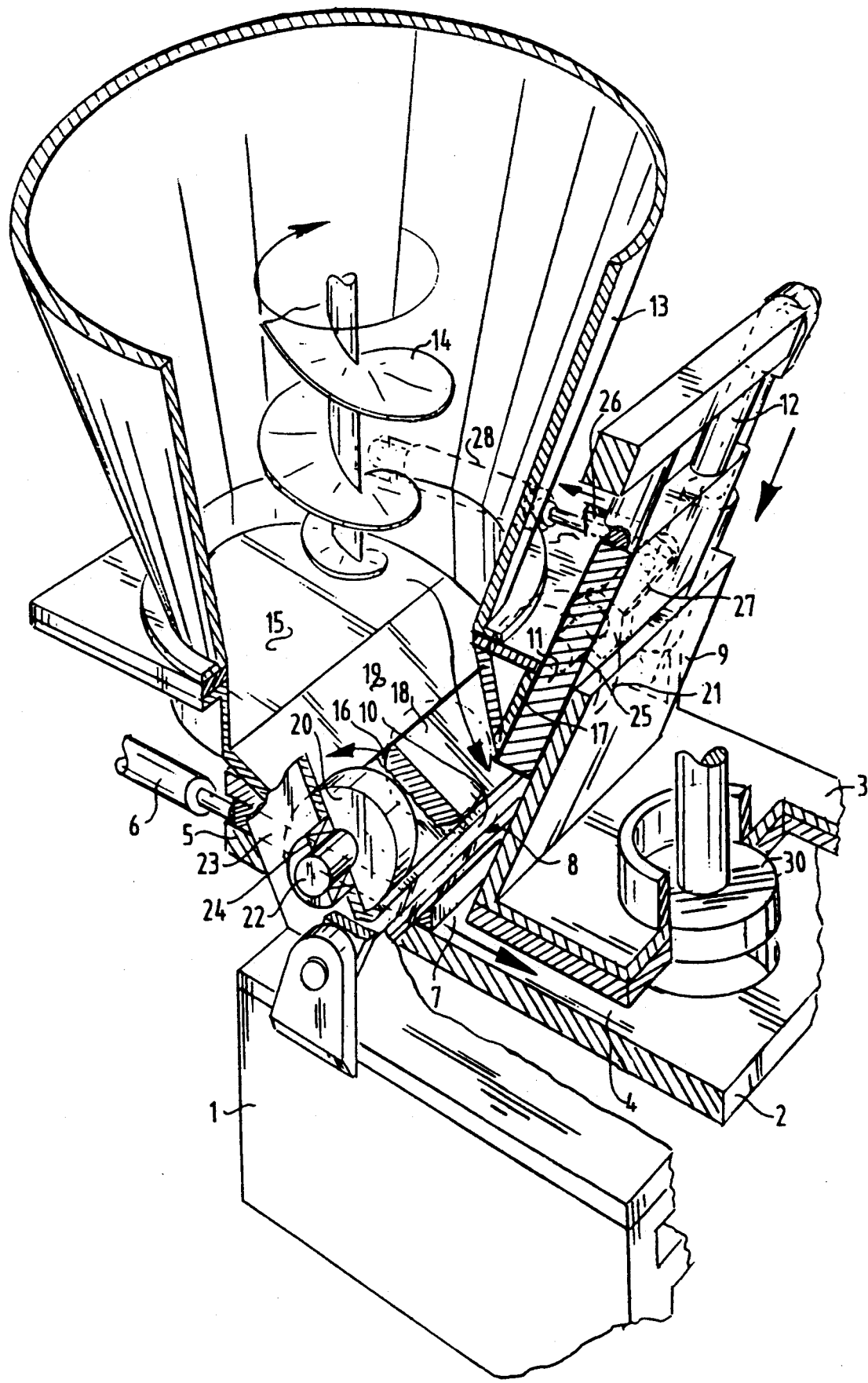

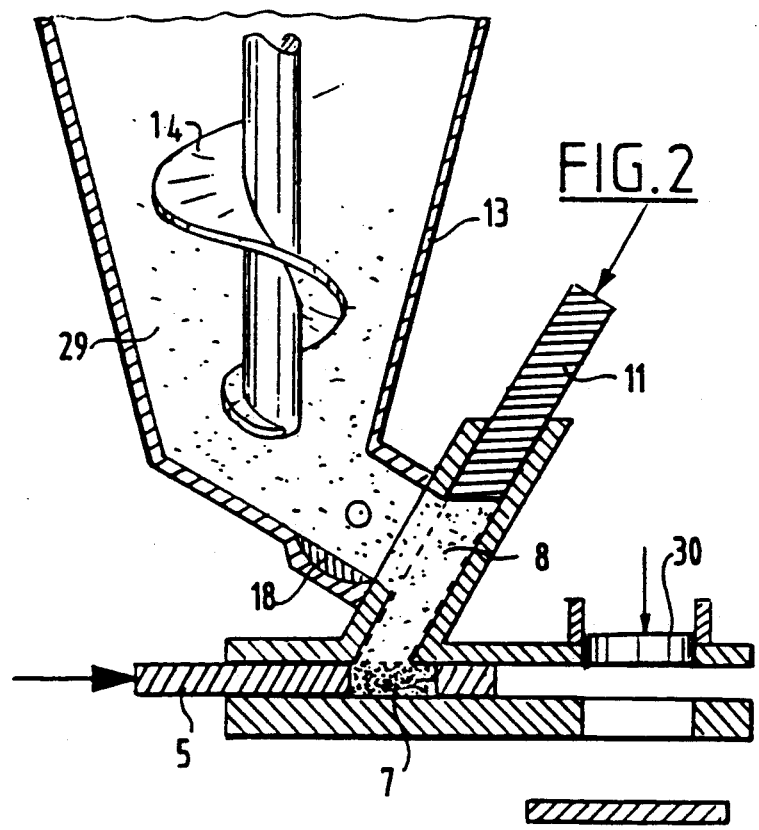
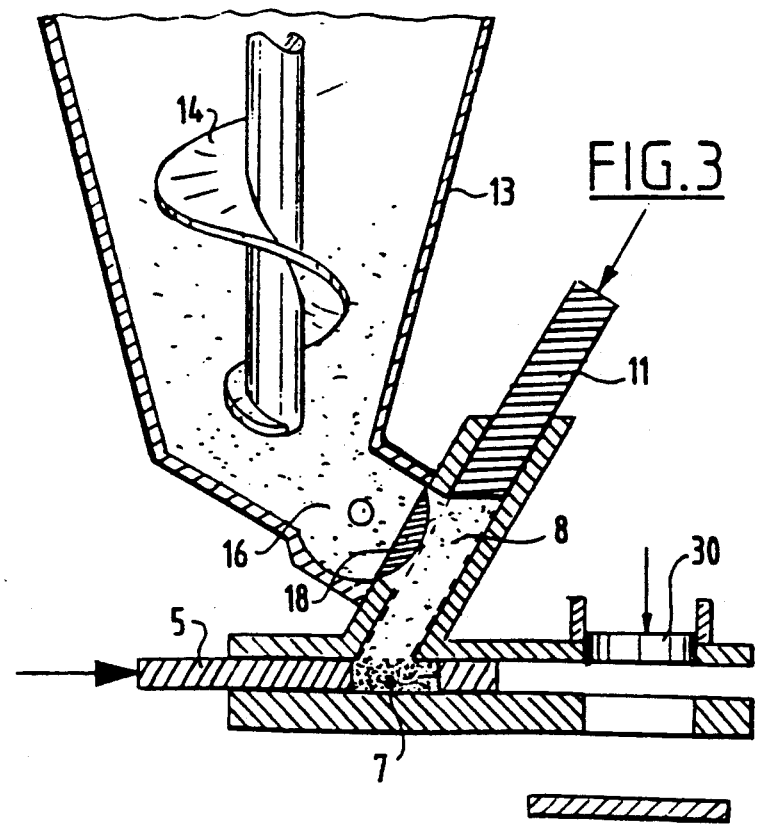

DEVICE FOR DOSING INTO MOULDS

BACKGROUND OF THE INVENTION

The present invention relates to a device for dosing into moulds a plastic, perishable mass, comprising: a feed vessel; a pressing chamber connected to the feed vessel via a channel; a piston movable in the pressing chamber; and a mould chamber connected to the pressing chamber and in which a mould for filling with the mass is placeable.

Such devices are generally known. They are often used for shaping hamburgers and other products to be prepared from a meat mass. The pressure generated by the piston during pressing can, for example in the case of masses made up of more than one component, lead to disintegration of the mass. This means that under pressure the first liquifying component leaves the mass under pressure of the piston so that separation occurs.

There is the further danger that under pressure from the piston the mass is pressed back into the feed vessel.

The present invention attempts to avoid these drawbacks by providing a valve arranged in the channel.

This prevents the meat mass flowing back to the feed vessel and separation occurring.

When a plate slidable in linear direction is employed as valve, which plate is movable in the channel such that this is entirely closed, the problem arises that when the valve is in the withdrawn position there are edges present between the valve and the wall of the channel, against which edges so-called dead spaces are formed in which meat mass can collect which is no longer further transported towards the pressing chamber. Despite the low temperature generally usual with such devices, intensified bacterial growth can develop over a period of time, so that the device has to be stopped and cleaned. This results in considerable time and production losses. It is therefore important to suppress bacterial growth as far as possible in this known device.

According to a preferred embodiment of the invention the valve can in the opened position be flush countersunk into a wall of the channel.

As a result of these steps dead spaces and edges no longer occur, so that the meat mass for dosing can no longer be left behind, and excessive bacterial growth is avoided. From the Dutch patent application 79.06962 a dosing device is known which tries to avoid dead spaces and edges by providing a second valve. This leads, however, to a dosing device with a complicated construction. Also this known valve may cause incorrect dosing, as the main valve may take dosed material from the space 11 during its return movement. Further this known valve is not provided with limiting ridge, so that it can be pushed through its closed position by the force excerted by the piston.

BRIEF DESCRIPTION OF THE DRAWINGS

The present invention will now be elucidated with reference to the annexed drawings, in which:

FIG. 1 shows a partially broken away perspective view of a device according to the present invention;

FIG. 2 shows a sectional view of the device depicted in FIG. 1, wherein the valve is in the opened position;

FIG. 3 shows a sectional view of the device shown in FIG. 1 with the valve in the closed position.

DETAILED DESCRIPTION OF THE INVENTION

Figure 4:
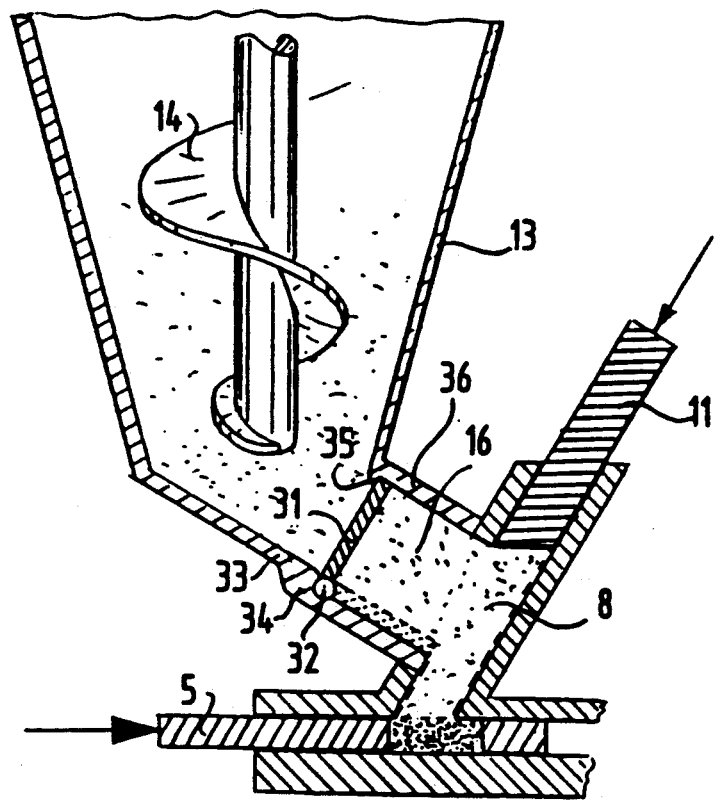
FIG. 4 shows a cross-sectional view of another embodiment of the valve according to the present invention.

The device shown in FIG. 1 is formed by a frame 1 onto which is fixed a plate 2. A top plate 3 is fixed at some distance above the bottom plate 2 so that a mould chamber 4 is created therebetween. In the mould chamber 4 a mould plate 5 is movable in the lengthwise direction by means of a pneumatic or hydraulic cylinder 6. A mould hole 7 is arranged in the mould plate 5. A pressing chamber 8 bounded by the respective plates 9, 10 is arranged connecting onto the mould chamber 4. A piston 11 is movable in the pressing chamber 8 likewise by means of a hydraulic or pneumatic cylinder 12.

Further arranged is a feed hopper 13 in which a drivable transport screw 14 is fixed by means of bearings (not shown in the drawing). The underside of the feed hopper is connected to the top plate 3. Formed between the feed hopper 14 and the pressing chamber 8 is a channel 16 that is bounded on the top by a wall 17 and on the bottom by a valve 18, which forms the subject of the present invention.

The valve 18 has in section the shape of a circle segment. The bottom wall 19 of the channel 16 otherwise has shape such that in the closed position the valve 18 sinks entirely into the wall. The valve 18 is connected on either sides to a rotatable disc 20 and 21. On the side of the disc 20 this is further connected to a shaft stump 22 which is mounted in a side wall 23 by means of a bearing 24. Arranged on the side of the disc 21 is a shaft stump, wherein both shaft stumps 22, 25 lie mutually in line. The shaft stump 25 is mounted in a side wall 26. The shaft stump 25 is further provided with a lever 27 which is movable by means of a hydraulic or pneumatic cylinder 28.

The operation of the device according to the present invention will be further described with reference to FIGS. 2 and 3.

Present in the feed hopper 13 is a quantity of meat mass 29 which is moved downward by the transport screw 14 and the force of gravity. When the valve 18 is opened, as shown in FIG. 2, the meat mass will be pressed through the channel 16 into the pressing chamber 8. Since the channel 16 is entirely provided with smooth, seamless walls the whole of the meat mass will fall into the pressing chamber and no remnants will be left behind.

Thereafter the valve 18 is closed by being turned to the position shown in FIG. 3 by means of the hydraulic cylinder 28, the lever 27, the shaft stump 25 and the disc 21. The valve is provided with a sharp edge which moves easily through the meat mass present in the channel. The meat mass is hardly cut or crushed therein, so that no separation or structure change occurs and the quality of the meat mass is not affected.

The piston 11 is then moved downward by the hydraulic cylinder, so that the meat mass present in the pressing chamber is pressed into the mould hole 7 in the mould plate 5. The mould plate 5 is subsequently moved to its ejecting position wherein the mould plate is emptied by pushing out a piston. The mould plate thereafter moves back again to its original position so that an empty mould hole 7 is present under the pressing chamber. The piston 11 is simultaneously returned to its starting position and the valve is rotated back again to its original countersunk position for supply of a new quantity of meat mass. Since the other edge of the valve is also sharp, this edge valve will be able to move through the meat mass present in the channel without problem.

The cycle is then repeated.

In the embodiment shown in FIG. 4 the valve has another shape. The valve in the embodiment comprises a flat body 31, which is at one side connected with a hinge 32, of which the axis extends in the plane of the lower wall 33 of the channel 16. To provide space for the hinge 32 the lower wall 33 has been provided with a bulge 34.

The positioning of the hinge 32 and the valve 31 is such, that in its closed position the valve closes the channel 16, so that the mass present in the pressure chamber 8 and the channel 16 is prevented from flowing back into the feed vessel 13. From its closed position the valve 16 may be moved towards its opened position by a suitable actuator working on the hinge. This movement of the valve has a component in the direction of flowing of the mass.

In its closed position the valve rests against an abutment 35 provided on the upper wall 36 of the channel 16. This abutment may have the shape of a rim extending at the inner side of the upper wall 36, but it may also be a single knob. This abutment has the effect that the valve 31 can easily withstand the forces exerted by the piston on the mass, leading to a relative simple construction of the valve and the hinge.

To avoid edges where the mass may collect and remain, the upstream side of the abutment 35 is chamfered. Further, the hinge 32 is also constructed such that "dead corners" and edges are avoided. The positioning of the hinge 32 is such, that in its opened position the distal end of the valve 31 is substantially in the plane of one wall of the pressing chamber 8 having the same effect.

This position is in FIG. 4 indicated in dotted lines.

In order to increase the production capacity a number of such machines can be placed operating in parallel. It is then possible to allow the movements of the components of the various machines to take place simultaneously and for example to embody the mould plate as a common plate and to provide it with a number of mould holes equal to the number of machines operating in parallel.

The present invention is elucidated above with reference to a machine for dosing a meat mass, although it is also applicable to machines for dosing for example soya bean pastes.

We claim:

1. A device for dosing into moulds a plastic, perishable mass, comprising:
    a feed vessel;
    a feed channel having an infeed and an outfeed, said infeed being connected to said feed vessel;
    chamber means, connected to said outfeed of said feed channel and having an inlet and an outlet, for receiving a dose of said mass at said inlet via said outfeed of said feed channel;
    mould means, situated at said outlet of said chamber means, for receiving said dose from said chamber means, said mould means comprising at least one hole in a top surface thereof, said hole being alignable with said outlet of said chamber means so as to receive said dose therefrom;
    piston means, reciprocable within said chamber means, for pushing said dose out of said outlet of said chamber means and into said hole of said mould means on a forward stroke of said piston means, with a face of said piston means being generally coplanar with said top surface of said mould means at an end of said forward stroke; and
    a valve situated within said feed channel and by which said outfeed is closeable.

2. The device as in claim 1, and further comprising:
    said valve being flush countersunk in a wall of said feed channel.

3. The device as in claim 2, wherein said valve is rotatable.

4. The device as in claim 3, and said valve further comprising:
    a leading edge and a trailing edge relative to a direction of movement of said valve to a closed position; and
    said leading edge being sharp.

5. The device as in claim 3, wherein said valve, in cross-section, has the shape of a circle segment.

6. The device as in claim 3, wherein said mould means further comprises:
    another channel; and
    a plate reciprocable and close fitting within said another channel, said plate having said hole therein.

7. The device as in claim 3, and further comprising:
    a rotation axis of said valve extending through said feed channel.

8. The device as in claim 3, wherein said mould means further comprises:
    another channel; and
    a plate reciprocable and close fitting within said another channel, said plate having said hole therein.

9. The device as in claim 2, and said valve further comprising:
    a leading edge and a trailing edge relative to a direction of movement of said valve to a closed position; and
    said leading edge being sharp.

10. The device as in claim 2, wherein said mould means further comprises:
    another channel; and
    a plate reciprocable and close fitting within said another channel, said plate having said hole therein.

11. The device as in claim 1, and said valve further comprising:
    a leading edge and a trailing edge relative to a direction of movement of said valve to a closed position; and
    said leading edge being sharp.

12. The device as in claim 11, wherein said valve, in cross-section, has the shape of a circle segment.

13. The device as in claim 11, wherein said mould means further comprises:
    another channel; and
    a plate reciprocable and close fitting within said another channel, said plate having said hole therein.

14. A plurality of devices for dosing into moulds a plastic, perishable mass, each said device comprising:
    a feed vessel;
    a feed channel having an infeed and an outfeed, said infeed being connected to said feed vessel;
    chamber means, connected to said outfeed of said feed channel and having an inlet and an outlet, for receiving a dose of said mass at said inlet via said outfeed of said feed channel;
    mould means, situated at said outlet of said chamber means, for receiving said dose from said chamber means, said mould means comprising at least one hole in a top surface thereof, said hole being alignable with said outlet of said chamber means so as to receive said dose therefrom;

piston means, reciprocable within said chamber means, for pushing said dose out of said outlet of said chamber means and into said hole of said mould means on a forward stroke of said piston means, with a face of said piston means being generally coplanar with said top surface of said mould means at an end of said forward stroke;

a valve situated within said feed channel and by which said outfeed is closeable; and a plate member common to each of said mould means and slidable therein, said plate member having a plurality of pockets each of which is alignable with a hole of a corresponding mould means in order to receive said dose in a compressed state.

15. A device for dosing into moulds a plastic, perishable mass, comprising:

a feed vessel;

a piston movable in the pressing chamber;

a mould chamber means, connected to the pressing chamber, for receiving a mould for filling with the mass; and a valve means, arranged in the channel, for blocking passage of said mass into said pressing chamber, said valve means being swingable around an axis extending substantially within a plane of a wall of said channel and engageable with an abutment situated on another wall of said channel such that, when said valve means is closed, pressure from the pressing chamber urges the valve means into engagement with said abutment.

16. A device as in claim 15, wherein said abutment is a rim.

17. A device as in claim 16, and further comprising:

said rim being chamfered on a side thereof which faces said feed vessel; and a distal end of said valve means is substantially in a plane of one wall of the pressing chamber when said valve means is open.

* * * * *